Oct. 9, 1934.  G. W. BINNS  1,976,110
GRINDING MACHINE
Filed April 28, 1930  2 Sheets-Sheet 1
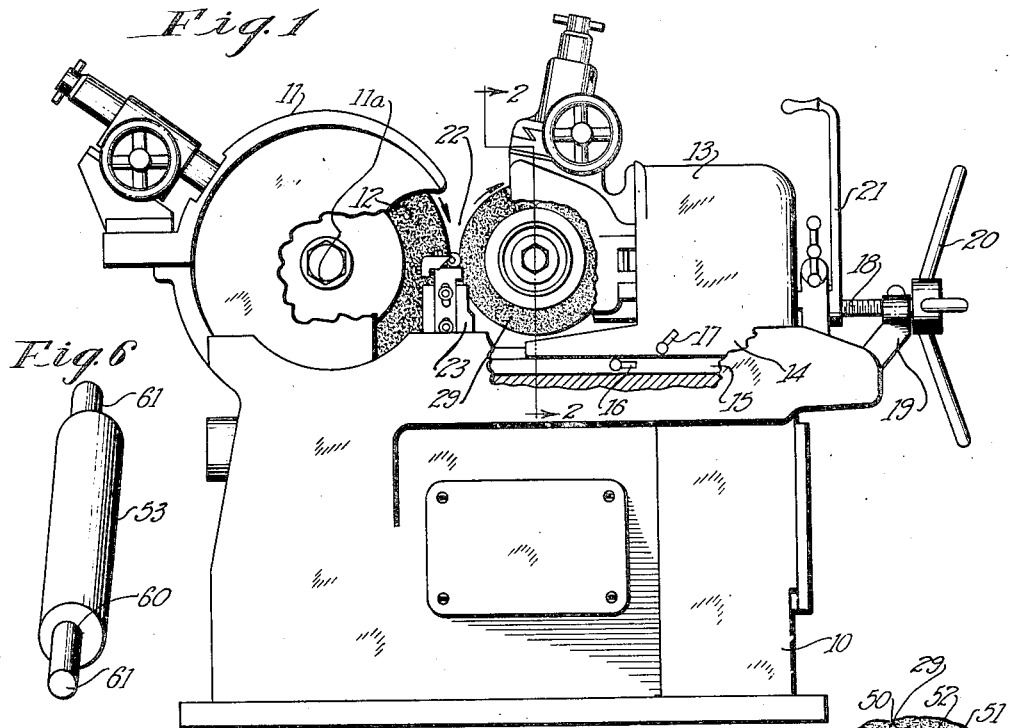
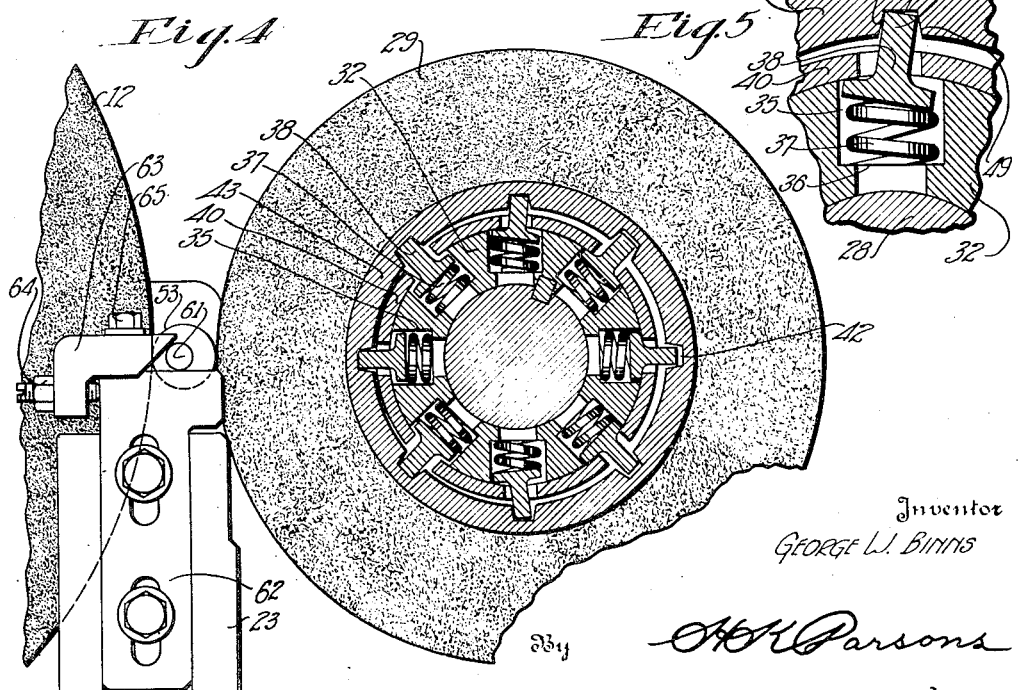
Inventor
GEORGE W. BINNS
by H. K. Parsons
Attorney Oct. 9, 1934.                G. W. BINNS                 1,976,110
                           GRINDING MACHINE
                      Filed April 28, 1930        2 Sheets-Sheet 2
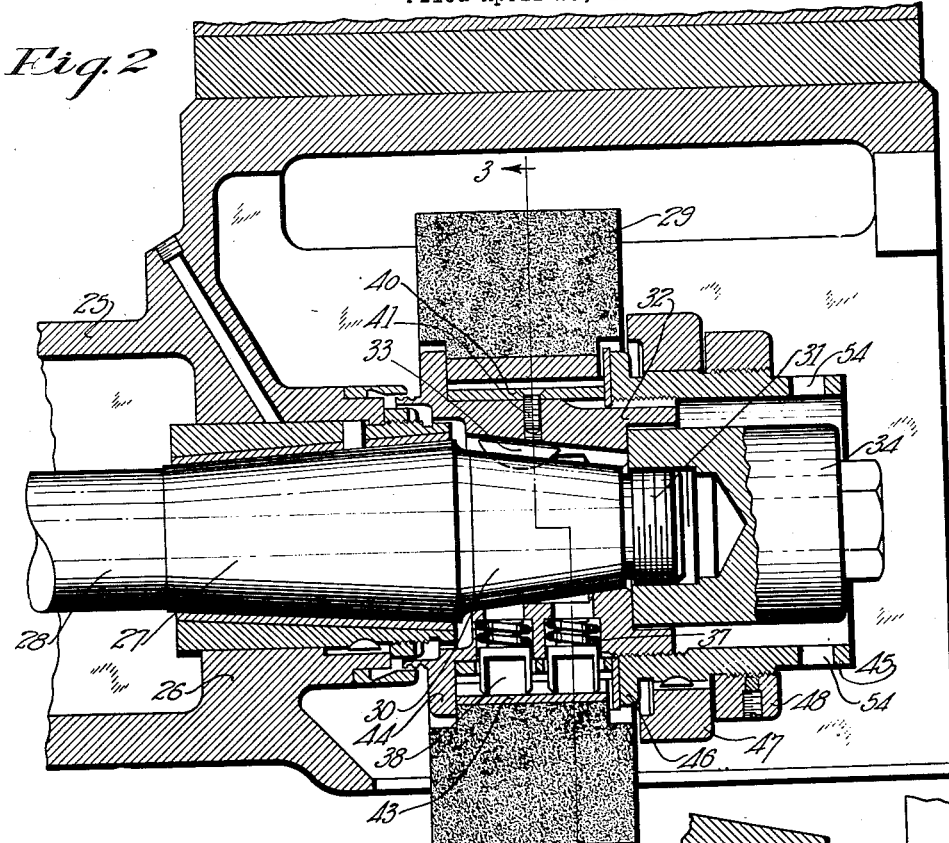
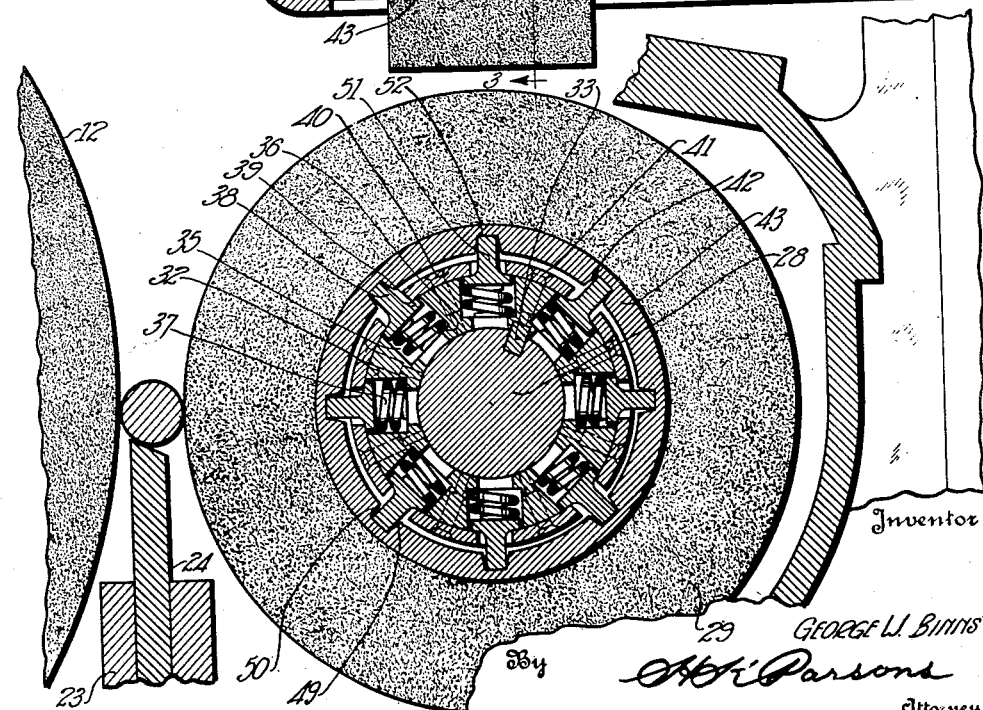

Patented Oct. 9, 1934

1,976,110

UNITED STATES PATENT OFFICE 1,976,110

GRINDING MACHINE

George W. Binns, Cincinnati, Ohio, assignor to Cincinnati Grinders Incorporated, Cincinnati, Ohio, a corporation of Ohio Application April 28, 1930, Serial No. 447,853

14 Claims. (Cl. 51—103)

This invention relates to improvements in grinding machines and more particularly to an improved wheel mount particularly adapted for use in precision grinding.

In the performance of precision grinding operations it is essential that the periphery of the work engaging wheel, whether that of the grinding wheel in an ordinary center type grinder, or that of the regulating wheel as well, in the case of a centerless grinder run absolutely true and concentric in order to produce work which shall be accurate within a fractional thousandth of an inch. At the same time it is desirable, although in the past it has been considered impossible of satisfactory accomplishment, that the wheel be capable of a slight yielding under unusual work conditions, such as pronounced out of roundness of the work, to prevent undue pressure between work and wheel tending to distort the work or break down the surface of the wheel. This is particularly desirable in the case of centerless grinders in which the rotation and grinding of the work are a function of two opposed wheels, the one exerting a grinding or cutting action, and the other a frictional control of the rotation of the work which is dependent on the joint pressure of the two wheels against the work.

It is one of the purposes, therefore, of the present invention to provide an improved construction of wheel mount applicable to a wheel unit whether utilized for grinding or for work regulating and control purposes which will normally maintain the wheel in proper concentric relation to its supporting and driving spindle, but which will permit of a yielding of the wheel under abnormal conditions while maintaining a constant proper engagement at all times between the wheel surface or active periphery and the work.

A further object of the present invention is the provision of an improved yieldable wheel mount so constructed as to effect a maximum stabilizing action minimizing the tendency of the yieldably mounted wheel to vibrate, and which will dampen out any vibrations and quickly reestablish the desired concentricity of axes of rotation of the wheel and its support.

A further object of the present invention is the provision of a structure particularly adapted for use in connection with the regulating wheel of a centerless grinding machine which will cause a constant yielding frictional engagement between the surface of the regulating wheel and eccentric or non-cylindrical work piece when the same is being rotated about a fixed predetermined axis and will therefore facilitate centerless grinding of this work piece to establish proper concentricity of the several portions or different diameters thereof.

Other objects and advantages of the present invention should be readily apparent by reference to the following specification considered in conjunction with the accompanying drawings forming a part thereof and it is to be understood that any modifications may be made in the specific structural details therein shown and described within the scope of the appended claims without departing from or exceeding the spirit of the invention.

In the drawings:

Figure 1 is a side elevation of a grinding machine embodying the improvements of this invention.

Figure 2 is a transverse sectional view through the regulating wheel and supporting unit as seen from line 2—2 on Figure 1.

Figure 3 is a longitudinal sectional view through the regulating wheel as seen from line 3—3 on Figure 2.

Figure 4 is a longitudinal sectional view through the regulating wheel similar to Figure 3 showing the wheel in a different position.

Figure 5 is an enlarged detail view of a portion of Figure 4 illustrating a position of driving pins during operation, and Figure 6 is a perspective view of a work piece of a type that may be operated upon by a device of this invention.

Throughout the several views of the drawings similar reference characters are employed to denote the same or similar parts.

In the drawings, the numeral 10 indicates the base or bed of a centerless grinding machine having fixedly secured thereto at the upper end thereof a grinding wheel unit 11 including a spindle 11a supporting the grinding wheel 12 for rotation at a high grinding rate of speed in a clockwise direction as indicated by the arrow adjacent thereto. Supported by the bed in opposition to the grinding wheel 12 is the regulating wheel unit 13 carried by a slide 14 for movement relative to a second supporting slide 15 likewise movable relative to the bed 10. Suitable clamping means 16 and 17 are provided for respectively securing the lower slide 15 to the bed 10 and the upper slide 14 and regulating wheel unit 13 to the slide 15 whereby the slide 14 may be moved relative to the slide 15 or the two slides moved as a unit relative to the bed 10. An adjusting screw 18 having threaded connection with the unit 13 is provided being journaled for rotative but not translative movement in a bracket 19 fastened on the bed 10. A pilot or hand wheel 20 is secured to the screw 18 exterior of the bracket 19 for actuating the same. In addition a manually actuable hand lever 21 is provided to rotate a nut to which it is secured and to thereby effect action of the unit 13 and slide 15 longitudinally of the bed 10.

The hand wheel 20 is primarily utilized for setting up the wheels and adjusting the width of the grinding throat 22 formed between the opposed faces of the grinding and regulating wheels, while the lever 21 is employed during the actual operation on a work piece for actuating the regulating wheel toward the grinding wheel to feed a work piece within the grinding throat into the grinding wheel. The foregoing description is well known to those conversant with this art and has been utilized heretofore.

Supported by the lower slide 15 at the inner end thereof is a block 23 carrying a work rest blade 24 subtending the grinding throat 22 and having an inclined top, inclining toward the face of the regulating wheel to form a trough with the said face of the regulating wheel in which the work pieces are positioned.

The regulating wheel unit 13 comprises a housing 25 providing a bearing 26 in which is journaled the enlarged portion 27 of the regulating wheel spindle 28. Means are provided, not shown, for rotating the spindle 28 and regulating wheel 29 carried thereby in a clockwise direction, as indicated by the arrow associated therewith in Figure 1, at a relatively slow work controlling rate of speed. This spindle 28 has adjacent to the enlarged portion 27 a tapered nose 30 ending in threads 31. A collet 32 is received on the tapered nose 30 of the spindle 28 and has a key-way formed therein in which key 33 carried by said nose 30 is received so that the spindle and collet rotate together. The collet is held on a spindle 28 by a nut 34 threadedly secured to the reduced threaded portion 31 of the spindle. This collet 32, as shown in Figures 3 and 4, is provided with a plurality of counter bored pockets or recesses 35 each having its axis extending radially from the axial center of the spindle 28 and each pocket has a seat 36 formed at the base thereof. Interiorly of the pockets 35 and resting on the seats 36 are coil springs 37 abutting and tending to force outwardly driving pins 38. The pins 38 are provided with a collar or flange 39 abutting the adjacent ends of segmental plates 40 secured by cap screws or the like 41 to the collet 32. The pins 38 extend beyond the segmental plates 40 into recesses or notches 42 formed interiorly of a ring 43 to which the regulating wheel 29 is secured, which, as shown in the drawings, is circular in contour having a relatively large bore. The ends or contact points 51 of all the pins 38 in the dead running position engage the base 52 of the notches or recesses 42.

In assembling the wheel of this construction the driving pins 38 are first mounted in the collet 32 with the springs 37 urging them outwardly to engage their collars or flanges 39 with the segmental plate 40. The collet is then mounted for rotation adjacent a grinding wheel and the ends 51 of the pins ground to a true diameter about the axis of rotation of the collet which is the axis of the spindle upon which it is to be later mounted. The bases 52 of the recesses 42 are likewise formed to a true diameter about the axial center of the ring 43. The diameter to which the ends 51 of the pins are finished and the diameter of the bases 52 of the recesses are substantially the same so that after the collet 32 has been secured on the end of its spindle by the nut 34, as described above, the wheel 29 and ring 43 may be slid over pins 38 with their ends 51 contacting with the bases 52 of the recesses 42 without in any way changing the tension on the springs 37. From this it will be noted that the driving pins have contact by their flanges with the segmental ring 40, and at their ends with the ring 43 whereby in the free running position of the wheel the active surface thereof runs true to the axis of rotation of its spindle.

By reference to Figures 4 and 5 it will be noted that the width of the pins 38 is the same as the width of the seats 52 and that the sides 49 and 50 of the recesses 42 are tapered and extend from the base 52 in a direction away from the sides of the pins with the corners of the pins positioned in the corners of the recesses or seats 42 formed by the sides 49 and 50 with the base 52.

In practice, this device is primarily utilized for forming a given surface of a work piece concentric to a preformed surface thereof or to a predetermined axis of rotation. As shown in Figure 6, the surface of the larger diameter 53 of the work piece 60 is to be ground or finished concentric to the surface of the smaller ends 61 thereof and concentric to the axis of rotation. To this end, as seen in Figure 4, the block 23 has secured on opposite ends thereof a narrow work rest blade 62 on which the ends 61 of the work piece rotate having the portion 53 in simultaneous engagement with the surfaces of the grinding and regulating wheels. A stop 63 is adjustably secured as by bolts 64 and 65 to the block 23 and engages the previously formed surface of the ends 61 to limit the movement of the axis of the piece toward the grinding wheel. From this it will be seen that the work piece is being rotated about the axis of the preformed end portions 61 and that the work piece is restrained from moving along the face of the blade 24 beyond a certain limit while the rotation thereof is controlled by and fed into the regulating wheel 29. The work piece is now in the position with the eccentric portion opposite the face of the grinding wheel and engaging the regulating wheel. The said eccentric part of the work piece has pushed the regulating wheel 29 off center as respects the axis of rotation of its spindle so that the work piece may be rotated without having an undue amount of stock removed from the thinner part thereof. At this time the parts forming the yielding regulating wheel will be in the position shown in Figure 4 in which it will be noted that the flanges of the driving pins on the side of the wheel adjacent its engagement with the work have been pressed into their pockets 35 against the yielding resistance of the springs 37 and that the seats 52 of the recesses 42 on the side of the wheel remote from the work are disengaged and spaced from the ends 51 of their driving pins. At the same time the pins intermediate the adjacent and remote pins just mentioned, namely, as shown in Figure 4, those diametrically opposite one another in a vertical plane are canted using one of their corners as a point. As the stock is removed from the work piece and it is being brought down to the desired concentric size the springs 37 above indicated as being compressed are constantly expanding and urging the work piece into the grinding wheel until the flanges of the depressed pins again engage with the segmental ring when the surface of the wheel will run true relative to its axis of rotation.

To hold the regulating wheel 29 and ring 43 in operative association with the collet 32 the said collet is formed on one end with a flange 44 and on its opposite end with screw threads receiving the internal threads formed in sleeve nut 45 which clamps the segmental ring 40 between a flange 46 formed on the sleeve nut and the flange 44. The flanges or collars 44 and 46 are larger in diameter than the ring 43 and the said collars are received in suitable depressions formed in the opposite sides of the wheel 29 where they engage the sides of said ring 43 and wheel 29 not with a clamping action but merely with sufficient pressure to prevent side play of the same while permitting them to shift under normal operation. To actuate the sleeve nut 45 use is made of a spanner wrench for which purpose openings 54 are provided therein.

To render the floating or yielding feature of the wheel inoperative, as when it is desired to use same for performing an ordinary centerless grinding operation, as shown in Figure 3, for example, a lock nut 48 threadedly carried by the sleeve nut 45, is actuated toward the wheel for urging a collar 47 slidably supported by the nut 45 into engagement with the wheel. This collar 47 clamps the wheel between itself and the flange 44 so that the active surface thereof runs true as respects the axis of rotation of its supporting spindle.

While this invention has been described in connection with the structure and mounting of the regulating wheel it is to be understood that the grinding wheel instead may be yieldably formed and mounted on its spindle and the same beneficial results obtained. It will further be noted that while the wheel itself will be bodily displaced while under pressure, the particular point of the said surface that engages the displacing force is rigid or non-yielding so that the regulating wheel 29, here shown, as made from suitable abrasive material, will at all times have proper frictional contact with the work piece.

What is claimed is:

1. In a device of the class described the combination of a bed, a pair of opposed grinding and regulating wheels forming a grinding throat therebetween, a spindle for each wheel, a work support within the grinding throat, means yieldably connecting one of said wheels with its spindle, and additional means for rendering the yieldable means inoperative.

2. In a device of the class described the combination of a bed, a pair of spindles rotatable about parallel axes carried by the bed, a grinding wheel on one spindle, and a yielding regulating wheel on the other spindle comprising a spider fixed to the spindle, a ring having a non-yielding active surface for frictional engagement with ar . controlling the rotation of a work piece surrounding the spider, and yielding means between the spider and the ring establishing a driving connection therebetween and whereby the active face of the wheel may be disposed with respect to the spindle.

3. A regulating wheel unit for use with a centerless grinder comprising a spindle rotatable at a comparatively slow rate of speed, a collet on one end of the spindle, the collet having radial pockets formed therein, a ring surrounding the collet and having a plurality of seats formed in the wall of the bore in the ring, and yieldable driving pins extending from the pockets in the collet into the seats in the ring whereby rotation of the collet effects a rotation of the ring.

4. A regulating wheel unit for use on a centerless grinder comprising a spindle rotatable at a comparatively slow rate of speed, a collet on one end of the spindle, the collet having radial pockets formed therein, a ring surrounding the collet and having a plurality of seats formed in the wall of the bore in the ring, yieldable driving pins extending from the pockets in the collet into the seats in the ring whereby rotation of the collet effects a rotation of the ring and means limiting the radial movement of the driving pins under the influence of the yieldable means so that the periphery of the ring runs concentric with the axis of the spindle.

5. A regulating wheel unit for use with a centerless grinder comprising a spindle rotatable at a comparatively slow rate of speed and having a tapered nose and threaded portion on one end thereof, a collet having a tapered bore corresponding to the tapered nose mounted thereon, a nut received on the threaded portion of the spindle for locking the collet to the nose of the spindle, a ring surrounding the collet and having a non-yielding active face for frictional engagement with and control of a work piece, and driving pins carried by the collet yieldably actuated radially thereof for establishing a driving connection between the ring and collet whereby upon engagement with an obstruction or the like the surface of the ring will rotate eccentric to its axis.

6. In a device of the class described the combination of a bed, a pair of wheels, each having a non-yielding active surface carried by the bed and forming a grinding throat therebetween of a definite size, one of the wheels being in the nature of a grinding wheel having a non-yielding mounting and the other wheel being in the nature of a regulating wheel having a yielding mounting, a work rest within the throat supporting a work piece while in engagement with the opposed non-yielding surfaces of the wheels and means associated with the yielding mounting of the regulating wheel for urging the work piece on the blade into the grinding wheel.

7. In a centerless grinder for the concentric grinding of work pieces comprising a bed, a pair of rotating spindles carried thereby, a grinding wheel on one of the spindles, a regulating wheel on the other spindle, the face of the wheels being spaced from one another to form a grinding throat therebetween, means within the throat for supporting the work for rotation during grinding, means for actuating one of the wheels toward the other to reduce the grinding throat and effect a stock removal of the work piece, means for limiting the axial approach of the work piece and grinding wheel, and yielding means between one of the wheels and its spindle.

8. In a centerless grinder the combination of a bed, a pair of opposed grinding and regulating wheels mounted thereon, a spindle for each wheel, a work rest blade between the wheels for peripherally supporting the body portion of a work piece, work supports adjacent the blade for peripherally supporting preformed portions of the work which project from the body portion, yielding means between one of the spindles and its wheel for relatively shifting the work and grinding wheel on the work supports, and means carried by the work supports for engagement with the preformed portions of the work to limit the said relative movement of the work and grinding wheel.

9. In a centerless grinder the combination of a bed, a pair of opposed grinding and regulating wheels mounted thereon, a spindle for each wheel, a work rest blade between the wheels for peripherally supporting the body portion of a work piece, work supports adjacent the blade for peripherally supporting preformed portions of the work which project from the body portion, yielding means between one of the spindles and its wheel for relatively shifting the work and grinding wheel on the work supports, means carried by the work supports for engagement with the preformed portions of the work to limit the said relative movement of the work and grinding wheel, said means comprising blocks having a tapered face and thereby forming with the work support a two point limiting stop.

10. In a centerless grinder the combination of a bed, a pair of opposed grinding and regulating wheels mounted thereon, a spindle for each wheel, a work rest blade between the wheels for peripherally supporting the body portion of a work piece, work supports adjacent the blade for peripherally supporting preformed portions of the work which project from the body portion, yielding means between one of the spindles and its wheel for relatively shifting the work and grinding wheel on the work supports, means carried by the work supports for engagement with the preformed portions of the work to limit the relative movement of the work and grinding wheel, said means comprising blocks having a tapered face and thereby forming with the work support a two point limiting stop, means for adjusting the blocks relative to the finished work portion supports, and additional means for adjusting the position of the finished work portion supports relative to the blade.

11. A regulating wheel unit for use with a centerless grinder comprising a spindle, a spider keyed to the spindle, the spider having a plurality of radial pockets formed therein and having a seat at the base of each pocket, driving pins extending outwardly from each pocket, yielding means within the pocket and abutting the seat and pins for yieldably urging the pins outwardly of the pocket, a segmental plate secured to the spider having the pins extending therebeyond and forming limit stops for the movement thereof under influence of the yielding means, and a ring-like wheel surrounding the spider and having an operative connection with the driving pins.

12. A regulating wheel unit for use with a centerless grinder comprising a spindle, a spider keyed to the spindle, the spider having a plurality of radial pockets formed therein providing a seat at the base of each pocket, driving pins extending outwardly from each pocket, yielding means within the pocket and abutting the seat and pins for yieldably urging the pins outwardly of the pocket, a segmental plate secured to the spider having the pins extending therebeyond and forming limit stops for the movement thereof under influence of the yielding means, a ring-like wheel surrounding the spider and having an operative connection with the driving pins, said wheel having formed in the walls of its bore notches to receive the ends of the driving pins, the notches having inclined walls whereby the wheel may have its center laterally displaced as respects the center of the spindle without breaking the driving connection with the pins.

13. In a device of the class described the combination of a rotating spindle having a tapered nose and threaded portion at one end thereof, a spider having a tapered bore conforming substantially to the taper of the spindle, a ring-like wheel surrounding the spider, yieldable connections between the spider and wheel whereby the wheel is driven by the spindle but is adapted to have its axis displaced as respects the axis of the spindle, a nut received on the threaded end of the spindle for securing the spider to the tapered portion thereof, a sleeve extending from the spider and overlying the clamping nut, and means carried by the sleeve for securing the wheel to the spider and preventing relative displacement of the wheel and spindle.

14. In a device of the class described the combination of a rotating spindle having a tapered nose and threaded portion at one end thereof, a spider having a tapered bore conforming substantially to the taper of the spindle, a ring-like wheel surrounding the spider, yieldable connections between the spider and wheel whereby the wheel is driven by the spindle but is adapted to have its axis displaced as respects the axis of the spindle, a nut received on the threaded end of the spindle for securing the spider to the tapered portion thereof, a sleeve extending from the spider and overlying the clamping nut, means carried by the sleeve for securing the wheel to the spider and preventing relative displacement of the wheel and spindle, said means comprising a clamping collar slidably mounted on the sleeve and a clamping nut threaded to the sleeve for shifting the clamping collar relative thereto.

GEORGE W. BINNS.